(12) United States Patent
Todeschini

(10) Patent No.: US 10,158,834 B2
(45) Date of Patent: Dec. 18, 2018

(54) CORRECTED PROJECTION PERSPECTIVE DISTORTION

(71) Applicant: Hand Held Products, Inc., Fort Mill, SC (US)

(72) Inventor: Erik Todeschini, Camillus, NY (US)

(73) Assignee: Hand Held Products, Inc., Fort Mill, SC (US)

(*) Notice: Subject to any disclaimer, the term of this patent is extended or adjusted under 35 U.S.C. 154(b) by 0 days.

(21) Appl. No.: 15/250,984

(22) Filed: Aug. 30, 2016

(65) Prior Publication Data

US 2018/0063495 A1    Mar. 1, 2018

(51) Int. Cl.
*H04N 9/31* (2006.01)

(52) U.S. Cl.
CPC ......... *H04N 9/3185* (2013.01); *H04N 9/3191* (2013.01); *H04N 9/3194* (2013.01)

(58) Field of Classification Search
CPC .................................................. G06K 7/10792
USPC ................. 348/744, 745, 181, 189, 175–178
See application file for complete search history.

(56) References Cited

U.S. PATENT DOCUMENTS

| | | | |
|---|---|---|---|
| 5,455,412 A * | 10/1995 | Imagawa | H04N 1/0473 250/208.1 |
| 6,488,353 B1 * | 12/2002 | Itoyama | B41J 2/0451 347/19 |
| 6,819,415 B2 * | 11/2004 | Gerstner | G02B 21/06 250/237 G |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |

(Continued)

FOREIGN PATENT DOCUMENTS

| | | |
|---|---|---|
| WO | 2013163789 A1 | 11/2013 |
| WO | 2013173985 A1 | 11/2013 |

(Continued)

OTHER PUBLICATIONS

U.S. Appl. No. 14/715,916 for Evaluating Image Values filed May 19, 2015 (Ackley); 60 pages.

(Continued)

*Primary Examiner* — Paulos M Natnael
(74) *Attorney, Agent, or Firm* — Additon, Higgins & Pendleton, P.A.

(57) ABSTRACT

Projecting an image is described. A test pattern is rendered over each of two dimensions of a projection surface. Upon the rendered test pattern conforming to a perspective related specification for a spatial configuration of data disposed over the two dimensions the data are decoded. An angle of a projection in each of the two dimensions corresponding to the rendering of the test pattern is detected, relative to a line orthogonal to a plane corresponding to a portion of the projection surface. Upon a nonconformity of the rendered test pattern to the specification, a transformation is computed to a spatial configuration of the rendered test pattern. The computed transformation relates to a perspective related characteristic of the spatial configuration corresponding to the angle of the projection. The projector is controlled based on the computed transformation.

16 Claims, 5 Drawing Sheets

(56) References Cited

U.S. PATENT DOCUMENTS

| | | |
|---|---|---|
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |

(56) References Cited

U.S. PATENT DOCUMENTS

| | | |
|---|---|---|
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,237,465 B1* | 1/2016 | Tanner ............... H04B 5/0031 |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,292,697 B2* | 3/2016 | Dougharty ............... G09C 5/00 |
| 9,298,932 B2* | 3/2016 | Dougharty ............... G09C 5/00 |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,222 B2 | 9/2016 | Singel et al. |
| 9,478,113 B2 | 10/2016 | Xie et al. |
| 2002/0021418 A1 | 2/2002 | Raskar |
| 2002/0050518 A1* | 5/2002 | Roustaei ............ G06K 7/10544 235/454 |
| 2002/0130915 A1* | 9/2002 | Izumi ..................... B41J 2/01 347/19 |
| 2004/0046989 A1* | 3/2004 | Matsugi ................ G06K 15/00 358/1.15 |
| 2004/0060011 A1* | 3/2004 | Nitta .................... H04N 1/0044 715/275 |
| 2005/0279922 A1* | 12/2005 | Wittenberg .............. H04N 5/74 250/234 |
| 2006/0106522 A1* | 5/2006 | Obradovich ........ B60R 16/0231 701/96 |
| 2007/0040878 A1* | 2/2007 | Ikefuji ................... B41J 29/393 347/90 |
| 2007/0051421 A1* | 3/2007 | Sarnoff ................ B41J 2/17506 141/83 |
| 2007/0063048 A1 | 3/2007 | Havens et al. |
| 2007/0145138 A1* | 6/2007 | Snyder .............. G06K 7/10544 235/462.01 |
| 2007/0165110 A1* | 7/2007 | Corley ................. H04N 17/002 348/188 |
| 2008/0043049 A1* | 2/2008 | Hamazaki ............ B41J 2/04541 347/10 |
| 2008/0117318 A1* | 5/2008 | Aoki ..................... H04N 5/367 348/246 |
| 2008/0152413 A1* | 6/2008 | Yoshida ................. B41J 2/2135 400/76 |
| 2008/0284987 A1* | 11/2008 | Yonezawa ............. H04N 9/3185 353/70 |
| 2009/0041481 A1* | 2/2009 | Iida .................... G03G 15/0896 399/12 |
| 2009/0134221 A1 | 5/2009 | Zhu et al. |
| 2009/0225121 A1* | 9/2009 | Miyamoto ............. B41J 2/2132 347/15 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2011/0235125 A1* | 9/2011 | Yoshida ................ H04N 1/4072 358/3.03 |
| 2012/0086987 A1* | 4/2012 | Tamura ................ G03G 15/011 358/3.24 |
| 2012/0111946 A1 | 5/2012 | Golant |
| 2012/0113183 A1* | 5/2012 | Ikeda ..................... B41J 2/2142 347/19 |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0206525 A1* | 8/2012 | Tanase .................. B41J 2/2132 347/14 |
| 2012/0223141 A1 | 9/2012 | Good et al. |
| 2012/0249741 A1* | 10/2012 | Maciocci ................. G06F 3/011 348/46 |
| 2013/0043312 A1 | 2/2013 | Van Horn |
| 2013/0075168 A1 | 3/2013 | Amundsen et al. |
| 2013/0137510 A1* | 5/2013 | Weber ................. G07F 17/3227 463/29 |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |

(56) References Cited

U.S. PATENT DOCUMENTS

| | | |
|---|---|---|
| 2013/0313325 A1 | 11/2013 | Wilz et al. |
| 2013/0321773 A1* | 12/2013 | Lee .................... A61B 3/10 351/211 |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0020117 A1 | 1/2014 | Nagai et al. |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0093070 A1* | 4/2014 | Dougharty .............. G09C 5/00 380/28 |
| 2014/0095888 A1* | 4/2014 | Dougharty .............. G09C 5/00 713/189 |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0316991 A1* | 10/2014 | Moshal ............ G06F 17/30879 705/64 |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0006672 A1* | 1/2015 | Morel ................ G06Q 30/0269 709/217 |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0036056 A1 | 2/2015 | Ogawa |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |

(56) References Cited

U.S. PATENT DOCUMENTS

| | | | |
|---|---|---|---|
| 2015/0142492 A1 | 5/2015 | Kumar | |
| 2015/0144692 A1 | 5/2015 | Hejl | |
| 2015/0144698 A1 | 5/2015 | Teng et al. | |
| 2015/0144701 A1 | 5/2015 | Xian et al. | |
| 2015/0149946 A1 | 5/2015 | Benos et al. | |
| 2015/0161429 A1 | 6/2015 | Xian | |
| 2015/0169925 A1 | 6/2015 | Chang et al. | |
| 2015/0169929 A1 | 6/2015 | Williams et al. | |
| 2015/0186703 A1 | 7/2015 | Chen et al. | |
| 2015/0193644 A1 | 7/2015 | Kearney et al. | |
| 2015/0193645 A1 | 7/2015 | Colavito et al. | |
| 2015/0199957 A1 | 7/2015 | Funyak et al. | |
| 2015/0204671 A1 | 7/2015 | Showering | |
| 2015/0210199 A1 | 7/2015 | Payne | |
| 2015/0220753 A1 | 8/2015 | Zhu et al. | |
| 2015/0254485 A1 | 9/2015 | Feng et al. | |
| 2015/0302284 A1* | 10/2015 | Ido | G03G 15/556 358/1.9 |
| 2015/0327012 A1 | 11/2015 | Bian et al. | |
| 2016/0014251 A1 | 1/2016 | Hejl | |
| 2016/0014623 A1* | 1/2016 | Tanner | H04B 5/0031 455/41.1 |
| 2016/0040982 A1 | 2/2016 | Li et al. | |
| 2016/0042241 A1 | 2/2016 | Todeschini | |
| 2016/0057230 A1 | 2/2016 | Todeschini et al. | |
| 2016/0109219 A1 | 4/2016 | Ackley et al. | |
| 2016/0109220 A1 | 4/2016 | Laffargue | |
| 2016/0109224 A1 | 4/2016 | Thuries et al. | |
| 2016/0112631 A1 | 4/2016 | Ackley et al. | |
| 2016/0112643 A1 | 4/2016 | Laffargue et al. | |
| 2016/0124516 A1 | 5/2016 | Schoon et al. | |
| 2016/0125217 A1 | 5/2016 | Todeschini | |
| 2016/0125342 A1 | 5/2016 | Miller et al. | |
| 2016/0133253 A1 | 5/2016 | Braho et al. | |
| 2016/0171720 A1 | 6/2016 | Todeschini | |
| 2016/0178479 A1 | 6/2016 | Goldsmith | |
| 2016/0180678 A1 | 6/2016 | Ackley et al. | |
| 2016/0189087 A1 | 6/2016 | Morton et al. | |
| 2016/0125873 A1 | 7/2016 | Braho et al. | |
| 2016/0227912 A1 | 8/2016 | Oberpriller et al. | |
| 2016/0232891 A1 | 8/2016 | Pecorari | |
| 2016/0292477 A1 | 10/2016 | Bidwell | |
| 2016/0294779 A1 | 10/2016 | Yeakley et al. | |
| 2016/0306769 A1 | 10/2016 | Kohtz et al. | |
| 2016/0314276 A1 | 10/2016 | Sewell et al. | |
| 2016/0314294 A1 | 10/2016 | Kubler et al. | |

FOREIGN PATENT DOCUMENTS

| | | | |
|---|---|---|---|
| WO | 2014019130 A1 | 2/2014 | |
| WO | 2014110495 A1 | 7/2014 | |

OTHER PUBLICATIONS

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch For a Mobile Electronic Device filed Jun. 16, 2015 (Bamdringa); 38 pages.

U.S. Appl. No. 14/740,373 for Calibrating a Volume Dimensioner filed Jun. 16, 2015 (Ackley et al.); 63 pages.

U.S. Appl. No. 13/367,978, filed Feb. 7, 2012, (Feng et al.); now abandoned.

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

Extended Search Report in related European Application No. 17185658.6 dated Jan. 26, 2018, pp. 1-13.

Mobile Commerce News, "QR codes provide Epson projector connectivity", Retrieved from the Internet: URL: http://www.qrcodepress.com/qr-codes-provide-epson-projector-connectivity/8528345, Sep. 18, 2014, pp. 1-5 [Cited in EP Search Report].

* cited by examiner

EXAMPLE COMPARISON OF PROJECTION PERSPECTIVES 10
11 UNCORRECTED AND
DISTORTED PERSPECTIVE
12 UNDISTORTED AND
CORRECTED PERSPECTIVE
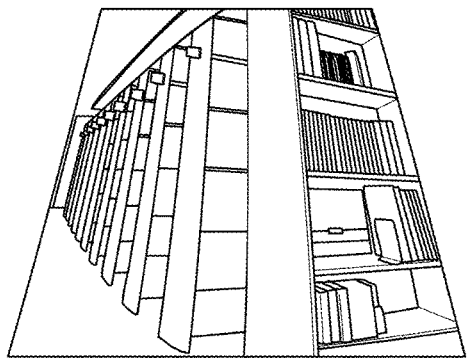
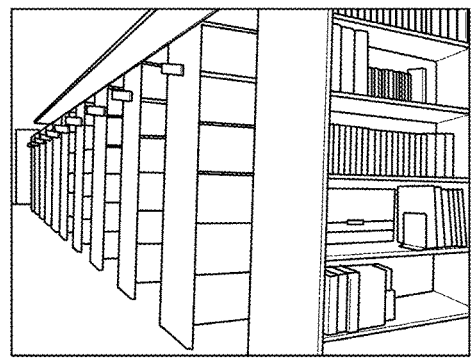
FIG. 1A
FIG. 1B

EXAMPLE PROJECTION PERSPECTIVE TEST PATTERNS 30

31

PERSPECTIVE DISTORTION
(NO DECODE)

32

CORRECTED IMAGE
(DECODED!)

CORRECTED PROJECTION PERSPECTIVE DISTORTION

TECHNOLOGY FIELD

The present invention relates generally to images. More particularly, example embodiments of the present invention relate to projecting an image.

BACKGROUND

Generally speaking, projection is useful for presenting information as a visual rendering upon a projection surface. The visual information may comprise images and graphic data, such as text, symbols, and data patterns. The data patterns may comprise bar codes disposed over a single dimension, as well as matrix patterns disposed over two dimensions. Two dimensional (2D) data patterns comprise quick response (QR) codes and Han Xin codes. The spatial configuration with which the information is presented is significant to successful, intelligible, and/or legible communication therewith.

In the projection of an image, however, the spatial configuration thereof may become distorted. For example, the spatial configuration of an image may be disposed over a substantially rectangular field. If the image is viewed directly, the rectangular field of its spatial configuration may be readily apparent to observers. The visual information presented by the image may thus be communicated readily to the direct viewers. Orthogonal projections of the image upon substantially planar projection surfaces, likewise, may present the spatial configurations without significant distortion.

The visual information presented by the orthogonal projections on planar projection surfaces, likewise, may be readily communicated to observers. The perspective of the image, as viewed directly, conforms to the perspective of the image in its orthogonal projection on a planar surface. In some projections, however, the perspective presented by the spatial configuration of the projected images may become distorted, relative to the perspective presented by the rectangular (or other) spatial configuration of the images, as the images are viewed directly.

It may be useful, therefore, to present images in projections with similar spatial configurations as characterize the images when viewed directly. It may also be useful to project the images without distorting the perspective of the image, relative to the perspective of the image when viewed directly. It may be useful, further, to correct distorted perspectives in projected images.

SUMMARY

Accordingly, in one aspect, an example embodiment of the present invention relates to present images in projections with similar spatial configurations as characterize the images when viewed directly. An example embodiment of the present invention may project the images without distorting the perspective of the image, relative to the perspective of the image when viewed directly. Example embodiments of the present invention, further, correct distorted perspectives in projected images.

Example embodiments of the present invention are described in relation to systems and methods for projecting an image. A projector is operable for rendering a test pattern over each of two dimensions of a projection surface. A scanner is operable for reading data encoded therewith. The scanner reads the data upon the rendered test pattern conforming to a perspective related specification for a spatial configuration data disposed over the two dimensions. A sensor is operable for detecting an angle of a projection in each of the two dimensions corresponding to the rendering of the test pattern, relative to a line orthogonal to a plane corresponding to a portion of the projection surface. A processor is operable for computing a transformation to a spatial configuration of the rendered test pattern. The transformation is computed upon a nonconformity of the rendered test pattern related to the specification. The computed transformation relates to a perspective related characteristic of the spatial configuration corresponding to the angle of the projection. The projector is controlled based on the computed transformation.

An example embodiment relates to a non-transitory computer readable storage medium. An example embodiment relates to a network platform.

The foregoing illustrative summary, as well as other example features, functions and/or aspects or features of embodiments of the invention, and the manner in which the same may be implemented or accomplished, are further explained within the following detailed description of example embodiments and each figure ("FIG.") of the accompanying drawings referred to therein.

BRIEF DESCRIPTION OF THE DRAWINGS

FIG. 1A depicts an example of an uncorrected and distorted perspective;

FIG. 1B depicts an example of a corrected and undistorted perspective, according to an embodiment of the present invention;

DESCRIPTION OF EXAMPLE EMBODIMENTS

Figure 2:
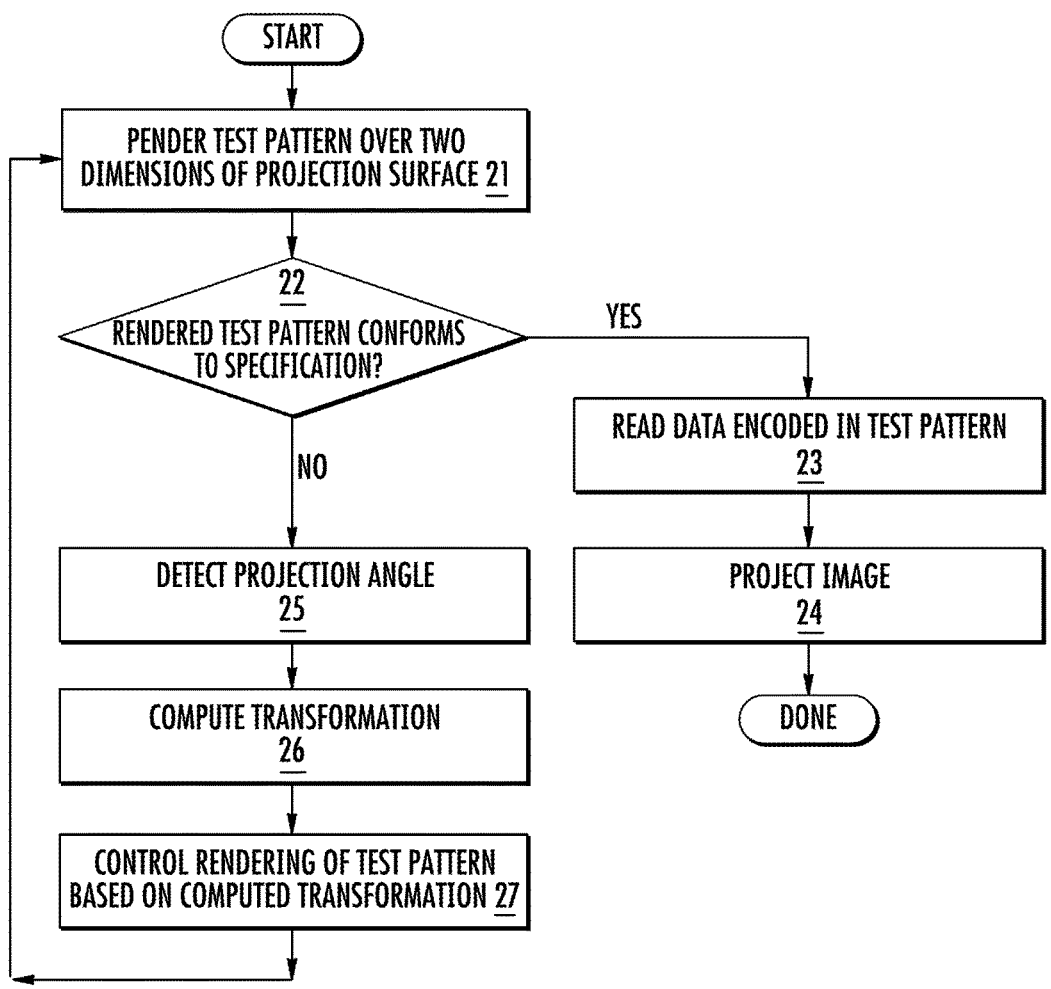
FIG. 2 depicts a flowchart for an example process for projecting an image, according to an embodiment of the present invention.

The present invention embraces methods and apparatus for presenting images in projections with similar spatial configurations as characterize the images when viewed directly. An example embodiment of the present invention may project the images, such as barcodes, without distorting the perspective of the image, relative to the perspective of the image when viewed directly. Example embodiments of the present invention, further, correct distorted perspectives in projected images. The distortions may be referred to as the "keystone effect".

The keystone effect may be caused by attempting to project an image onto a surface at an angle, as with a projector which may be not quite centered onto the screen it is projecting on. A distortion of the image dimensions may result, such as making a square look like a trapezoid, the shape of an architectural keystone, hence the name of the feature. In a typical case of a projector sitting on a table, and looking upwards to the screen, the image is larger at the top than on the bottom. FIG. 1A illustrates the keystone effect.

The present invention discloses a method to perform a keystone correction by utilizing the tolerances of a two-dimensional barcode decoding algorithm and a projectable two-dimensional barcode in a feedback loop. A two dimensional barcode, such as a QR code, may have a very rigid pattern that must be maintained (within tolerances) in order for a decodable indicia reader to be able to find and decode the image. The present invention can project a two dimensional barcode onto a surface while the decodable indicia reader attempted to read the bar code. The projector can then skew this image in multiple directions while the indicia reader may continue to attempt to read the barcode. Data from accelerometers and gyroscopes within the scanner may be used to predict the angle at which the projection is occurring. This information may be used to calculate the transformation that may allow the image to appear normally and allow a keystone correction in a shorter period of time. In other words, once this angle of projection is determined, an algorithm may perform a transformation on the barcode image to allow the image to be projected as if the image was projected from directly above its surface. This approach makes the assumption that the surface you are projecting on is flat. If inertial sensor data is not available, the software may begin to transform the barcode image by skewing it horizontally, then vertically and then a mixture of both until a barcode is successfully decoded.

Once the barcode is successfully decoded, minor corrections, i.e. tweaks, may be performed to minimize the overall decode time. This image transformation may then be used to transform images before they are projected. Additionally, a recalibration of the image transformation may be manually initiated, initiated after x duration of time, or initiated when the scanner's inertial sensors detected movement.

An implementation of the present invention may comprise software/firmware that may reside either in the projection scanner or on a host system. The software may project a pre-scanned two dimensional barcode (e.g. QR Code) image onto the surface while the barcode scanner attempts to decode the image.

Example embodiments of the present invention are described in relation to methods and systems for projecting an image. A test pattern is rendered over each of two dimensions of a projection surface. Upon the rendered test pattern conforming to a perspective related specification for a spatial configuration of data disposed over the two dimensions the data are decoded. An angle of a projection in each of the two dimensions corresponding to the rendering of the test pattern is detected, relative to a line orthogonal to a plane corresponding to a portion of the projection surface. Upon a nonconformity of the rendered test pattern to the specification, a transformation is computed to a spatial configuration of the rendered test pattern. The computed transformation relates to a perspective related characteristic of the spatial configuration corresponding to the angle of the projection. The projector is controlled based on the computed transformation.

Overview

An example embodiment of the present invention relates to presenting images in projections with similar spatial configurations as characterize the images when viewed directly. An example embodiment of the present invention may project the images without distorting the perspective of the image, relative to the perspective of the image when viewed directly. Example embodiments of the present invention, further, correct distorted perspectives in projected images.

An example embodiment of the present invention relates to a system for projecting an image. The system comprises at least a projector, scanner, sensor, and processor. The projector is operable for rendering a test pattern over each of two dimensions of a projection surface. The scanner is operable for reading data encoded therewith. The scanner reads the data upon the rendered test pattern conforming to a perspective related specification for a spatial configuration data disposed over the two dimensions. The sensor is operable for detecting an angle of a projection in each of the two dimensions corresponding to the rendering of the test pattern, relative to a line orthogonal to a plane corresponding to a portion of the projection surface. The processor is operable for computing a transformation to a spatial configuration of the rendered test pattern. The transformation is computed upon a nonconformity of the rendered test pattern related to the specification. The computed transformation relates to a perspective related characteristic of the spatial configuration corresponding to the angle of the projection. The projector is controlled based on the computed transformation.

In an example embodiment, the projector is operable, further, upon the reading of the data encoded with the rendered test pattern, for rendering the image upon the projection surface. In a case in which the test pattern is rendered with a correct perspective, its corresponding spatial configuration conforms to the specification and the scanner may read the rendered test pattern upon a single, initial projection. In this case, the image may be projected with no further action, as the projection of the image is configured spatially and optically corresponding to the spatial configuration of the rendered test pattern.

In a case in which the test pattern is rendered with a skewed, or otherwise distorted perspective, its corresponding spatial configuration may be nonconforming to the specification and the scanner may refrain from reading its data, until it is rendered subsequently with a perspective corrected by the transformation. In relation to the rendering of the image upon the projection surface therefore, the projector is operable for the rendering of the image, in which it is projected onto the projection surface based on the computed transformation.

The sensor is operable, further, for repeating the detecting of the angle of the projection. The processor is operable, further and heuristically, for repeating the computing of the transformation, and the controlling of the projector based on the computed transformation.

The nonconformity of the test pattern relates to a distortion of the spatial configuration over one or more of the two dimensions. The spatial configuration comprises a rectangular plane. The distortion comprises a trapezoidal distortion disposed over the rectangular plane.

Example embodiments may be implemented in which the sensor comprises an accelerometer and/or a gyroscope. The sensor may comprise a device related to a microelectromechanical system (MEMS). Internal sensor data from the accelerometer and/or gyroscope and/or MEMS may be used to predict the angle of the projection.

Example embodiments may be implemented in which the rendered test pattern comprises one or more of a two dimensional (2D) data pattern. The 2D data pattern may comprise, for example, Quick Response (QR) codes and/or Han Xin codes. The specification may comprise a technical standard promulgated by a technical authority. For example, the specification may comprise, or otherwise relate to the 'ANSI/UCC5' standard of the American National Standards Institute (ANSI), and/or the 'ISO/IEC 12516' standard of the International Electrotechnical Commission (IEC), and International Organization for Standardization (ISO).

An example embodiment relates to a network platform, with which the projection system is operable. In an example embodiment, the system comprises, further, a non-transitory computer-readable storage medium, such as a memory, storage device, etc. The storage medium is operable for exchanging data signals with the processor. The storage medium comprises instructions, based on which the processor is operable in relation to an image projection process. The image projection process may relate to a method described herein.

An example embodiment of the present invention relates to a method for projecting an image. A test pattern is rendered over each of two dimensions of a projection surface. A conformity of the rendered test pattern to a perspective related specification is determined. The specification relates to a spatial configuration of the data disposed over the two dimensions.

Based on a determination that the rendered test pattern conforms to the specification, data encoded with the rendered test pattern is read. The images may then be projected.

Based on a determination that the rendered test pattern comprises a perspective related nonconformity related to the specification, an angle of a projection is detected in each of the two dimensions corresponding to the rendering of the test pattern, relative to a line orthogonal to a plane corresponding to at least a portion of the projection surface. A transformation is computed to a spatial configuration of the rendered test pattern, which transforms a perspective related characteristic of the spatial configuration corresponding to the angle of the projection. The rendering of the test pattern step is controlled based on the computed transformation.

In an example embodiment, the image is rendered upon the projection surface. The rendering of the image may be based on the computed transformation.

Upon the controlling of the projector based on the computed transformation, the rendering of the test pattern comprises rendering the 2D test pattern based on the computed transformation.

In an example embodiment, the detection of the angle of the projection, computation of the transformation to the spatial configuration of the rendered test pattern, and/or controlling of the rendering of the test pattern based on the computed transformation may be repeated heuristically. For example, the projection angle detection, transformation computation, and/or control over the rendering of the test pattern may be heuristically repeated until the data encoded therein at least becomes readable, the conformity of the test pattern to the specification, the readability, perspective, legibility, and/or aesthetic appearance in relation to one or more objective and/or subjective criteria are optimized.

The nonconformity of the test pattern may relate to a distortion of the spatial configuration over one or more of the two dimensions. The spatial configuration may comprise a rectangular plane. The distortion may comprise a trapezoidal distortion disposed over the rectangular plane. For example, the spatial configuration may comprise a distortion in the perspective of a projection related to keystone distortion, sometimes also referred to as "tombstone" distortion.

The rendered test pattern may comprise a QR or Han Xin code. The specification may comprise a standard promulgated by one or more technical authorities, such as ANSI/UCC5 and/or ISO/IEC 12516.

An example embodiment relates to a non-transitory computer-readable storage medium, The storage medium comprises instructions, which upon execution by one or more processors, causes, configures, controls, effectuates, or programs a process for projecting an image. The projection process may relate to the method described herein.

Example Perspectives

Visual information captured in relation to a scene by contemporary cameras and optics typically represents a spatial perspective of the scene accurately in relation to direct viewing of the scene. In this sense, the accuracy and direct viewing relate to visual perception of the scene by observers with healthy, normal, and/or corrected visual acuity. Projections of accurate captured images may become distorted optically.

For example, a projection of an accurate captured image may become skewed by a trapezoidal spatial distortion, relative to the accurate spatial perspective. The trapezoidal skewing may be referred to as 'keystone' (sometimes also, or alternatively called "tombstone") distortion, or "keystoning." A comparison 10 of projection perspectives is presented in FIG. 1A and FIG. 1B. FIG. 1A depicts an example of a distorted perspective 11, which may be associated with an uncorrected projection of a captured scene.

FIG. 1B depicts an example of a corrected perspective 12, which may represent an undistorted projection of the captured scene corrected according to an embodiment of the present invention. The corrected perspective 12 represents the spatial perspective of the captured image of the scene accurately. The corrected perspective 12 represents the scene as it appears to observers viewing the scene directly. Compared to the corrected perspective 12, the trapezoidal keystone distortion is apparent in the uncorrected perspective 11.

Example Image Projection Process

An example embodiment of the present invention relates to a method for projecting an image. FIG. 2 depicts a flowchart for an example image projection process 20 for presenting projecting an image, according to an embodiment of the present invention.

In step 21, a test pattern is rendered over each of two dimensions of a projection surface.

In step 22, a conformity of the rendered test pattern to a perspective related specification is determined. The specification relates to a spatial configuration of the data disposed over the two dimensions.

In step 23, data encoded with the rendered test pattern is read based on a determination that the rendered test pattern conforms to the specification.

In step 24, the image may then be projected.

In step 25, based on a determination that the rendered test pattern comprises a perspective related nonconformity related to the specification, an angle of a projection is detected in each of the two dimensions corresponding to the rendering of the test pattern. The angle of the projection is determined relative to a line orthogonal to a plane corresponding to at least a portion of the projection surface.

In step 26, a transformation is computed to a spatial configuration of the rendered test pattern, which transforms a perspective related characteristic of the spatial configuration corresponding to the angle of the projection.

In step 27, the rendering of the test pattern (step 21) is controlled based on the computed transformation.

In an example embodiment, the projected image is rendered upon the projection surface. The rendering of the image (step 24) may be based on the computed transformation.

Upon the controlling (step 27) based on the computed transformation, the rendering of the test pattern (step 21) comprises rendering the 2D test pattern based on the computed transformation. The rendering of the test pattern based on the computed transformation.

In an example embodiment, the detection of the angle of the projection (step 25), the computation of the transformation to the spatial configuration of the rendered test pattern (step 26), and/or controlling of the rendering of the test pattern based on the computed transformation (step 27) may be repeated heuristically.

For example, the projection angle detection (step 25), transformation computation (step 26), and/or control over the rendering of the test pattern (step 27) may be heuristically repeated until the data encoded therein at least becomes readable. The steps 25, 26, and 27, inclusive, may also be heuristically repeated to optimize the conformity of the test pattern to the specification, the readability, perspective, legibility, and/or aesthetic appearance in relation to one or more objective and/or subjective criteria.

An example embodiment may be implemented in which the rendered test pattern comprises a 2D data pattern. The 2D data pattern may comprise a QR code or Han Xin code. The specification may comprise a standard related to a spatial configuration of the 2D data pattern. The specification may be promulgated, published, and/or set forth by one or more technical authorities, such as ANSI, ISO, and/or IEC. The specification may comprise the 'ANSI/UCC5' standard and/or the 'ISO/IEC 12516' standard.

The nonconformity of the test pattern to the specification may relate to a distortion of the spatial configuration over one or more of the two dimensions. The spatial configuration may comprise a rectangular plane. The distortion may comprise a trapezoidal distortion, such as keystoning, disposed over the rectangular plane. A comparison, test patterns 30, of projection perspectives related to the 2D data test patterns is presented in FIG. 3A and FIG. 3B.

Figure 3A:
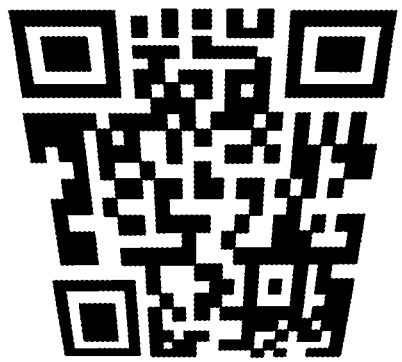
FIG. 3A depicts an example test pattern projected with a distorted perspective.

FIG. 3A depicts an example test pattern projected with a distorted perspective. The test pattern 31 represents an unreadably skewed QR of Han Xin data pattern. Upon execution of the step 25, step 26, and step 27, inclusive, the perspective of the test pattern may be corrected.

Figure 3B:
FIG. 3B depicts an example test pattern projected with an undistorted perspective and/or corrected, according to an embodiment of the present invention.

FIG. 3B depicts an example test pattern projected with an undistorted perspective and/or corrected, according to an embodiment of the present invention. The test pattern 32 represents a 2D data pattern with a sufficiently undistorted spatial configuration to conform to the specification and allow decoding of data encoded therein. The images may be projected (step 24) undistorted according to the projection with which the test pattern 32 is rendered.

An example embodiment may be implemented in which the images projected at step 24 comprise commercial information. The commercial information may comprise data related to identity, quality, quantity, origin, supplier, manufacturer, age, pricing, content, and/or other characteristics related to goods, products, parts, materials, etc. The projection surface may correspond to a surface of one of the items and the image may thus be projected onto a portion of the surface of the item. The commercial information may also (or alternatively) comprise an advertisement, brand, coupon, description, emblem, icon, likeness, photograph, premium, presentation (e.g., educational, informational, testimonial, promotional, etc.), registration, representation, symbol, trademark, etc. The projected image may be interactive. For example, the projected image may comprise a 2D data pattern disposed, included, incorporated, or presented with an advertisement, coupon, or premium, which may be accessed, actuated, cashed-in, effectuated, implemented, provided, triggered, and/or used by scanning the image with a camera and/or scanner device of a mobile device, such as a "smart phone."

An example embodiment relates to a non-transitory computer-readable storage medium. The storage medium comprises instructions, which upon execution by one or more processors, causes, configures, controls, effectuates, or programs a process for projecting an image. The projection process may relate to the method, process 20, for projecting an image, and may be performed by an image projection system.

Example Projection System

Figure 4:
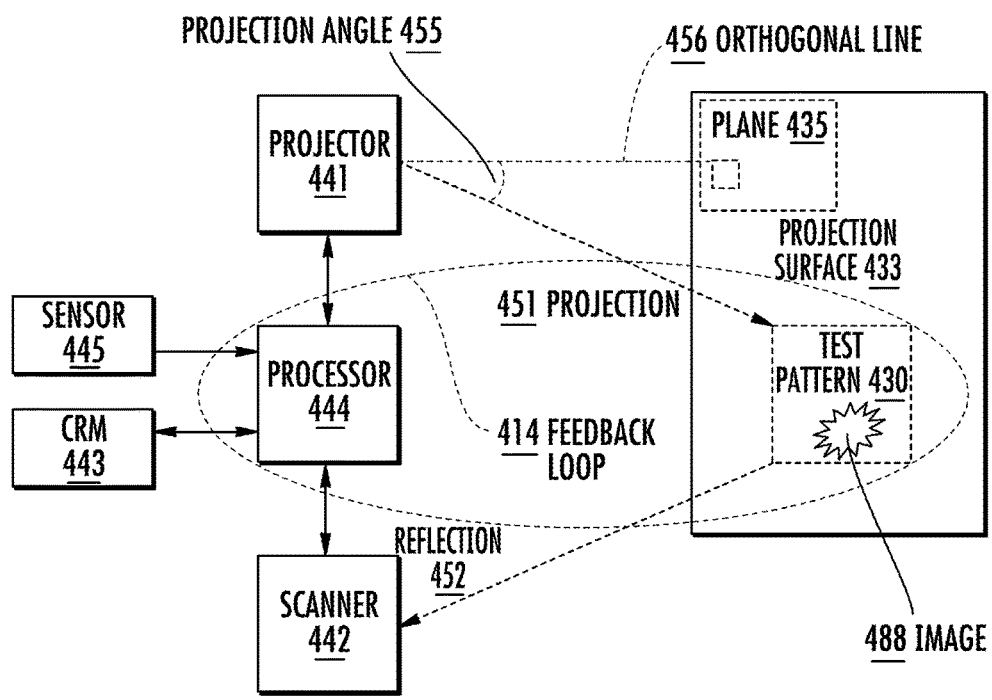
FIG. 4 depicts an example system for projecting an image, according to an embodiment of the present invention.

An example embodiment of the present invention relates to a system for projecting an image. FIG. 4 depicts a system 400 for projecting an image, according to an embodiment of the present invention. The system may comprise at least a projector 441, scanner 442, sensor 445, and processor 444.

The projector 441 is operable for rendering a test pattern 430 over each of two dimensions of a projection surface 433. Projection surface 433 may be a reflective surface. Test pattern 430 may be illustrated by test patterns 30 of FIGS. 3A and 3B.

The scanner 442 is operable for reading data encoded with the test pattern 430. The scanner 442 reads the data upon the rendered test pattern 430 conforming to a perspective related specification for a spatial configuration data disposed over the two dimensions.

The test pattern 430 may be projected with perspective related spatial distortion sufficient to be noncompliant with the specification. The scanner 442 may fail to read data, with a perspective distortion, e.g., test pattern 31. If the test pattern is noncompliant with the specification, data encoded therewith may thus be unreadable.

The sensor 445 is operable for detecting the angle 455 of a projection 451 in each of the two dimensions corresponding to the rendering of the test pattern 430. The detection of the angle 455 of the projection 451 is measured relative to a line 456. The line 456 is orthogonal to a plane 435. The plane 435 corresponds to at least a portion of the projection surface 433.

The processor 444 is operable for computing a transformation to a spatial configuration of the rendered test pattern. The transformation is computed upon a nonconformity of the rendered test pattern 430 related to the specification. The computed transformation relates to a perspective related characteristic of the spatial configuration corresponding to the angle 455 of the projection 451. The processor 444 is operable, further, for controlling the projector 441 based on the computed transformation.

The processor 444 may be operable independently, e.g., as a central processing unit (CPU) of the system 400. The processor 444 may also represent multiple processor devices, which may be disposed independently, as well as with the scanner 442 and/or the projector 441. The projector 441, for example, may comprise a digital light processor (DLP). The scanner, for example, may comprise an image processor, a digital signal processor (DSP), and/or a graphics processing unit (GPU)

The system 400 may comprise a memory, storage device, or other non-transitory computer-readable storage medium (CRM) 443. The storage medium 443 comprises instructions, which when executed by the processor 444 are operable for causing, configuring, controlling, and/or programming the performance of operations, processes, and computations. For example, the instructions may relate to the performance of the projection method, process 20, (FIG.

2). The instructions are stored physically (e.g., electronically, electromagnetically, optically, etc.) with the medium.

The memory may comprise random access memory (RAM) and other dynamic memory. The memory may also comprise read-only memory (ROM) and other static memory. The memory may also comprise memory cells, latches, registers, caches, buffers, and other storage disposed with the processor 444 as components thereof. The storage device may comprise electronic media (e.g., "flash" drives, etc.) optical media (e.g., CD/ROM, DVD, BD, etc.), and/or electromagnetic "disk" drives. The storage device may be operable as "virtual" memory with the processor 444.

In an example embodiment, the projector 441 is operable, further, upon the reading of the data encoded with the rendered test pattern 430, for rendering the image 488 upon the projection surface 433. In a case in which the test pattern 430 is rendered with a correct perspective, its corresponding spatial configuration conforms to the specification and the scanner 442 may read the rendered test pattern 430 upon a single, initial projection. In this case, the image 488 may be projected with no further action, as the projection of the image 488 is configured spatially and optically corresponding to the specification compliant spatial configuration of the rendered test pattern 430.

The image 488 may comprise an area corresponding to a portion of the area of the projection surface 433 that is spanned by the test pattern 430. The image 488 may comprise an area corresponding to the entire area of the projection surface 433 spanned by the test pattern 430. The image 488 may comprise an area exceeding the area of the projection surface 433 spanned by the test pattern 430.

In a case in which the test pattern 430 is rendered with a skewed, or otherwise distorted perspective, its corresponding spatial configuration may be nonconforming to the specification and the scanner 442 may refrain from reading its data, until it is rendered subsequently with a perspective corrected by the transformation. In relation to the rendering of the image 488 upon the projection surface 433, the projector 441 is operable for the rendering of the image 488, in which the image 488 is projected onto the projection surface 433 based on the computed transformation.

In relation to the controlling of the projector 441 based on the computed transportation, the processor 444 is operable, further, for causing, commanding, configuring, and/or programming the projector 441 to transform, i.e. skew, the projection 451 of the test pattern 430. The test pattern 430 is rendered upon the projection surface 433 at the transformed or transformation-changed image. The sensor 445 is operable, further, for repeating the detecting of the angle 455 of the projection 451. The processor 444 is operable, further and heuristically, for repeating the computing of the transformation, and the controlling of the projector 441 based on the computed transformation.

The system 400 thus comprises a feedback loop 414, in which the spatial configuration of the test pattern 430 is adjusted heuristically by the control of processor 444 over the projector 441. The reflection 452 of the projected test pattern 430 is detected by the scanner 442 and fed back therefrom to the processor 444, for use in the computation of the transformation and corresponding control over the projector 441.

The nonconformity of the test pattern 430 relates to a distortion of the spatial configuration over one or more of the two dimensions. The spatial configuration comprises a rectangular plane. The distortion comprises a trapezoidal distortion disposed over the rectangular plane.

Example embodiments may be implemented in which the sensor 445 comprises an accelerometer and/or a gyroscope. The sensor 445 may comprise a device related to a microelectromechanical system (MEMS). The accelerator and/or gyroscope may comprise a MEMS device.

Example embodiments may be implemented in which the rendered test pattern 430 comprises a 2D data pattern, such as a QR code and/or Han Xin code. The specification may comprise the ANSI/UCC5 and/or ISO/IEC 12516 standard.

In an example embodiment, the image projection system 400 comprises a network link 450. The network link 450 is operable for exchanging data signals with the processor 444, the scanner 442, the projector 441, and/or the sensor 445. The network link 450 is operable, further, for exchanging data signals between the system 400 and a data and/or communication network.

Example Network Platform

Figure 5:
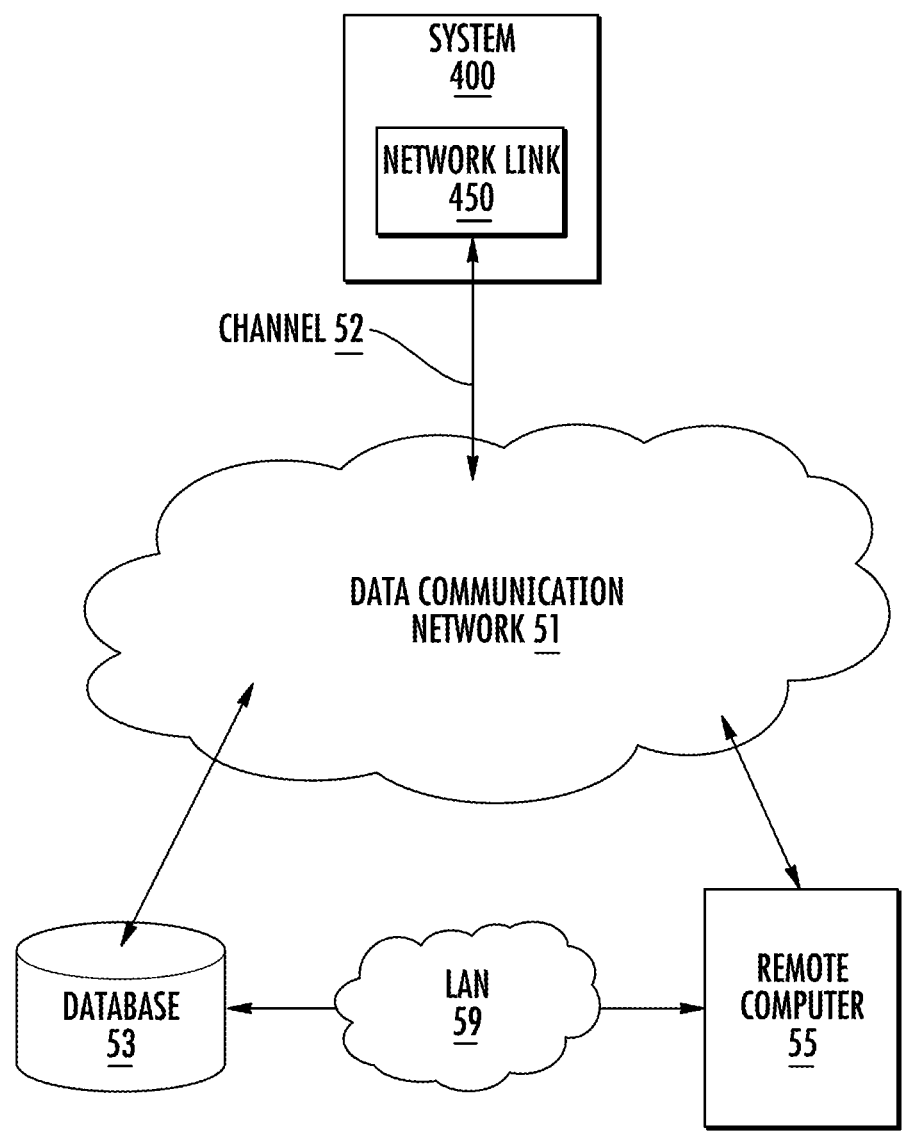
FIG. 5 depicts an example data communication network platform, according to an embodiment of the present invention.

An example embodiment relates to a network platform. FIG. 5 depicts an example data communication network platform 50, according to an embodiment of the present invention. The system 400 exchanges data signals, via the network link 450, with the data communication network 51 over a communication channel 52. The communication channel 52 may comprise wireless and/or wireline based data transmission media.

The network 51 is operable for communicating data signals in real time between entities coupled therewith. The network 51 comprises a packet-switched data and/or communication network operable based on a transfer control protocol and networking protocol such as TCP/IP.

A database 53 and/or a remote computer 55 are coupled to the network 51. The database 53 may comprise instructions related to the commercial information. The database 53 and the remote computer 55 may also be communicatively coupled over a network 51, and/or over a local area network (LAN) (or other network) 59. The communication channel 52 may also comprise, at least in part, a LAN. An example embodiment may be implemented in which the processor 444 is disposed with the remote computer. An example embodiment may be implemented in which the database 53 is associated with the storage medium 443.

In summary, a system for projecting an image, the system comprising: (i) a projector operable for rendering a test pattern over each of two dimensions of a projection surface; (ii) a scanner operable, upon the rendered test pattern conforming to a perspective related specification for a spatial configuration data disposed over the two dimensions, for reading data encoded therewith; (iii) a sensor operable for detecting an angle of a projection in each of the two dimensions corresponding to the rendering of the test pattern, relative to a line orthogonal to a plane corresponding to a portion of the projection surface; and (iv) a processor is operable for computing a spatial transformation over the rendered test pattern, upon a nonconformity thereof to the specification, the computed transformation comprising a perspective adjustment related to the angle of the projection, and for controlling the projector based on the computed transformation.

An exemplary embodiment includes a non-transitory computer-readable storage medium, comprising instructions, which upon execution by one or more processors, causes, configures, controls, effectuates, or programs a method for projecting an image, the method comprising the steps of: rendering a test pattern over each of two dimensions of a projection surface; determining a conformity of the rendered test pattern with a perspective related specification for a spatial configuration of data disposed over the two dimensions; based on the determining step comprising a determination that the rendered test pattern conforms to the specification, reading data encoded with the rendered test pattern, and upon the reading of the data, projecting the image; and based on the determining step comprising a determination that the rendered test pattern comprises a perspective related nonconformity related to the specification: (i) detecting an angle of a projection in each of the two dimensions corresponding to the rendering of the test pattern, relative to a line orthogonal to a plane corresponding to a portion of the projection surface; (ii) computing a transformation to a spatial configuration of the rendered test pattern, wherein a perspective related characteristic of the spatial configuration corresponding to the angle of the projection is transformed; and (iii) controlling the rendering of the test pattern step based on the computed transformation.

* * *

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; U.S. Design Pat. No. D702,237;

U.S. Pat. Nos. 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,167; 9,064,168; 9,064,254; 9,066,032; 9,070,032;

U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;

U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;

U.S. patent application Ser. No. 13/367,978 for a Laser Scanning Module Employing an Elastomeric U-Hinge Based Laser Scanning Assembly, filed Feb. 7, 2012 (Feng et al.);

U.S. patent application Ser. No. 29/458,405 for an Electronic Device, filed Jun. 19, 2013 (Fitch et al.);

U.S. patent application Ser. No. 29/459,620 for an Electronic Device Enclosure, filed Jul. 2, 2013 (London et al.);

U.S. patent application Ser. No. 29/468,118 for an Electronic Device Case, filed Sep. 26, 2013 (Oberpriller et al.);

U.S. patent application Ser. No. 14/150,393 for Indicia-reader Having Unitary Construction Scanner, filed Jan. 8, 2014 (Colavito et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 29/486,759 for an Imaging Terminal, filed Apr. 2, 2014 (Oberpriller et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTOCONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

* * *

Example embodiments of the present invention are thus useful for presenting images in projections with similar spatial configurations as characterize the images when viewed directly. Example embodiments of the present invention may project the images without distorting the perspective of the image, relative to the perspective of the image when viewed directly. Example embodiments of the present invention, further, correct distorted perspectives in projected images.

Example embodiments of the present invention are thus described in relation to systems and methods for projecting an image. A projector is operable for rendering a test pattern over each of two dimensions of a projection surface. A scanner is operable for reading data encoded therewith. The scanner reads the data upon the rendered test pattern conforming to a perspective related specification for a spatial configuration data disposed over the two dimensions. A sensor is operable for detecting an angle of a projection in each of the two dimensions corresponding to the rendering of the test pattern, relative to a line orthogonal to a plane corresponding to a portion of the projection surface. A processor is operable for computing a transformation to a spatial configuration of the rendered test pattern. The transformation is computed upon a nonconformity of the rendered test pattern related to the specification. The computed transformation relates to a perspective related characteristic of the spatial configuration corresponding to the angle of the projection. The projector is controlled based on the computed transformation.

For clarity and brevity, as well as to avoid unnecessary or unhelpful obfuscating, obscuring, obstructing, or occluding features of an example embodiment, certain intricacies and details, which are known generally to artisans of ordinary skill in related technologies, may have been omitted or discussed in less than exhaustive detail. Any such omissions or discussions are neither necessary for describing example embodiments of the invention, nor particularly relevant to understanding of significant elements, features, functions, and aspects of the example embodiments described herein.

In the specification and/or figures, typical embodiments of the invention have been disclosed. The present invention is not limited to such example embodiments. The use of the term "and/or" includes any and all combinations of one or more of the associated listed items, and the term "or" is used in an inclusive (and not exclusive) sense. The figures are schematic representations and so are not necessarily drawn to scale. Unless otherwise noted, specific terms have been used in a generic and descriptive sense and not for purposes of limitation.

What is claimed, is:

1. A system for projecting an image, the system comprising:

a projector operable for rendering a test pattern over each of two dimensions of a projection surface, the rendered test pattern being one or more of a two dimensional (2D) barcode, Quick Response (QR) code, and a Han Xin code;

a scanner operable, upon the rendered test pattern conforming to a perspective related specification for a spatial configuration of barcode data disposed over the two dimensions, for reading data encoded therewith;

a sensor operable for detecting an angle of a projection in each of the two dimensions corresponding to the rendering of the test pattern, relative to a line orthogonal to a plane corresponding to a portion of the projection surface; and a processor operable for computing a spatial transformation over the rendered test pattern, upon a nonconformity thereof to the specification, the computed transformation comprising a perspective adjustment related to the angle of the projection, and for controlling the projector based on the computed transformation, wherein the processor is operable, further, in relation to the controlling of the projector based on the computed transformation, for one or more of causing, commanding, configuring, or programming the projector to render the test pattern, wherein the sensor is operable, further, for repeating the detecting of the angle of the projection, and wherein the processor is operable, further and heuristically, for repeating the computing of the transformation, and the controlling of the projector based on the computed transformation.

2. The system as described in claim 1, wherein the projector is operable, further, upon the reading of the data encoded with the rendered test pattern, for rendering the image upon the projection surface.

3. The system as described in claim 2, wherein the projector is operable, in relation to the rendering of the image upon the projection surface, for the rendering of the image based on the computed transformation.

4. The system as described in claim 1, wherein the nonconformity of the test pattern relates to a distortion of the spatial configuration over one or more of the two dimensions.

5. The system as described in claim 4, wherein the spatial configuration comprises a rectangular plane, and wherein the distortion comprises a trapezoidal distortion disposed over the rectangular plane.

6. The system as described in claim 1, wherein the sensor comprises one or more of:
   an accelerometer;
   a gyroscope; or
   a device related to a microelectromechanical system (MEMS).

7. The system as described in claim 1, wherein the specification comprises one or more of:
   a technical standard 'ANSI/UCC5' of an authority comprising:
      American National Standards Institute (ANSI); or
   a technical standard 'ISO/IEC 12516' of an authority International Electrotechnical Commission (IEC), and an authority International Organization for Standardization (ISO).

8. The system as described in claim 1, further comprising a non-transitory computer-readable storage medium operable for exchanging data signals with the processor and comprising instructions relation to one or more operations of the processor.

9. A method for projecting an image, the method comprising the steps of:
   rendering a test pattern over each of two dimensions of a projection surface, the rendered test pattern being one or more of a two dimensional (2D) barcode, Quick Response (QR) code, and a Han Xin code;

determining a conformity of the rendered test pattern with a perspective related specification for spatial configuration of barcode data disposed over the two dimensions;

based on the determining step comprising a determination that the rendered test pattern conforms to the specification, reading data encoded with the rendered test pattern;

based on the determining step comprising a determination that the rendered test pattern comprises a perspective related nonconformity related to the specification:
      detecting an angle of a projection in each of the two dimensions corresponding to the rendering of the test pattern, relative to a line orthogonal to a plane corresponding to at least a portion of the projection surface;
      computing a transformation to a spatial configuration of the rendered test pattern, wherein a perspective related characteristic of the spatial configuration corresponding to the angle of the projection is transformed; and
      controlling the rendering of the test pattern step based on the computed transformation; and repeating, heuristically, one or more of the steps of detecting the angle of the projection, computing the transformation to the spatial configuration of the rendered test pattern, or controlling the rendering of the test pattern based on the computed transformation, wherein the computing the transformation to the spatial configuration comprises sequentially skewing the test pattern horizontally, then vertically, and then a combination of horizontally and vertically until the test pattern is successfully decoded.

10. The method as described in claim 9, further comprising the step of: rendering the image upon the projection surface.

11. The method as described in claim 10, wherein the rendering of the image step is based on the computed transformation.

12. The method as described in claim 9, wherein upon the controlling of a projector based on the computed transformation, the rendering of the test pattern comprises rendering the test pattern based on the computed transformation.

13. The method as described in claim 9, wherein the nonconformity of the test pattern relates to a distortion of the spatial configuration over one or more of the two dimensions.

14. The method as described in claim 13, wherein the spatial configuration comprises a rectangular plane, and wherein the distortion comprises a trapezoidal distortion disposed over the rectangular plane.

15. The method as described in claim 9, wherein the specification comprises:
   a technical standard 'ANSI/UCC5' of an American National Standards Institute (ANSI) authority; or
   a technical standard 'ISO/IEC 12516' of an International Electrotechnical Commission (IEC) authority, and an International Organization for Standardization (ISO) authority.

16. A non-transitory computer-readable storage medium, comprising instructions, which upon execution by one or more processors, causes, configures, controls, effectuates, or programs a method for projecting an image, the method comprising the steps of:

rendering a test pattern over each of two dimensions of a projection surface, the rendered test pattern being one or more of a two dimensional (2D) barcode, Quick Response (QR) code, and a Han Xin code;

determining a conformity of the rendered test pattern with a perspective related specification for spatial configuration of barcode data disposed over the two dimensions;

based on the determining step comprising a determination that the rendered test pattern conforms to the specification, reading data encoded with the rendered test pattern, and upon the reading of the data, projecting the image;

based on the determining step comprising a determination that the rendered test pattern comprises a perspective related nonconformity related to the specification:

detecting an angle of a projection in each of the two dimensions corresponding to the rendering of the test pattern, relative to a line orthogonal to a plane corresponding to a portion of the projection surface;

computing a transformation to a spatial configuration of the rendered test pattern, wherein a perspective related characteristic of the spatial configuration corresponding to the angle of the projection is transformed; and controlling the rendering of the test pattern step based on the computed transformation; and repeating, heuristically, one or more of the steps of detecting the angle of the projection, computing the transformation to the spatial configuration of the rendered test pattern, or controlling the rendering of the test pattern based on the computed transformation, wherein the computing the transformation to the spatial configuration comprises sequentially skewing the test pattern horizontally, then vertically, and then a combination of horizontally and vertically until the test pattern is successfully decoded.

* * * * *